United States Patent [19]
Hoben et al.

[11] Patent Number: 5,942,980
[45] Date of Patent: Aug. 24, 1999

[54] MULTI-SENSOR HYDROSTATIC GAUGE FOR FUEL STORAGE TANKS

[75] Inventors: John Charles Hoben; Allen Ray Westmoreland, both of Sugar Land, Tex.; Alexander Bukhman, Bat-Yam; Israel Bukhman, Tel-Aviv, both of Israel

[73] Assignee: Innovative Measurement Methods, Inc., Sugar Land, Tex.

[21] Appl. No.: 08/975,096

[22] Filed: Nov. 20, 1997

[51] Int. Cl.$^6$ ........................................... G08B 21/00
[52] U.S. Cl. .................. 340/618; 340/624; 340/627; 340/620; 340/622; 340/614
[58] Field of Search .................... 340/618, 624, 340/627, 619, 620, 621, 622, 623, 605, 614, 606; 403/299, 353, 301; 73/714, 730, 864.56, 866.5

[56] References Cited

U.S. PATENT DOCUMENTS

| | | | |
|---|---|---|---|
| 3,646,293 | 2/1972 | Howard | 340/618 |
| 4,371,790 | 2/1983 | Manning et al. | 307/118 |
| 4,377,550 | 3/1983 | Tokarz | 376/245 |
| 4,659,235 | 4/1987 | Gilmore, Jr. et al. | 374/143 |
| 4,739,786 | 4/1988 | Parkinson | 137/2 |
| 4,852,054 | 7/1989 | Mastandrea | 364/509 |
| 4,857,894 | 8/1989 | Dahl | 340/619 |
| 4,972,709 | 11/1990 | Bailey, Jr. et al. | 73/290 R |
| 5,031,452 | 7/1991 | Dobson et al. | 73/304 R |
| 5,121,340 | 6/1992 | Campbell et al. | 364/509 |
| 5,138,559 | 8/1992 | Kuehl et al. | 364/509 |
| 5,253,521 | 10/1993 | Abramovich et al. | 73/306 |
| 5,481,197 | 1/1996 | Sanders et al. | 324/690 |
| 5,578,993 | 11/1996 | Sitabkhan et al. | 340/614 |

*Primary Examiner*—Daniel J. Wu
*Assistant Examiner*—Toan N. Pham
*Attorney, Agent, or Firm*—Wendy Buskop; Bayko Gibson et al.

[57] ABSTRACT

A probe rod is provided with sensor housings, pipe sections, and joint sleeves all having a common outer diameter. The sensor housings and joint sleeves are threadably connected to the various pipe sections. The threadable connections have a double seal using an O-ring and threading paste that ensure a gas tight seal while being easy to assemble. Pressure and temperature sensors are mounted within the sensor housings. Output leads from the sensors are threaded through the pipe sections and through throughways in the sensor housings and joint sleeves to a circuitry box mounted on the top of the probe rod. The circuitry box contains electronics for processing signals generated by the sensors and for transmitting the results to a remote location.

29 Claims, 4 Drawing Sheets

MULTI-SENSOR HYDROSTATIC GAUGE FOR FUEL STORAGE TANKS

FIELD OF THE INVENTION

The present invention relates to gauges. More particularly, the present invention relates to gauges for large fuel storage tanks to measure the state properties of the liquids contained therein.

BACKGROUND OF THE INVENTION

Large storage tanks are used to store hydrocarbon-based fuels for future use. In many cases, tanks are arranged close to one another, forming tank farms. Probes are installed in or onto the tank to monitor both the amount of liquid in the tank and the condition of the liquid itself.

Hydrostatic tank gauging ("HTG") systems have been sold commercially since the early 1980's. HTG standards are described in the "Manual of Petroleum Measurement Standards," (American Petroleum Institute, November 1994), specifically, "Chapter 16—Measurement of Hydrocarbon Fluids by Weight or Mass," incorporated herein by reference for all purposes.

The typical HTG system includes 3 pressure sensors installed along the tank wall. The first sensor is placed near the bottom of the tank. The second sensor is placed about 10 feet above the bottom of the tank. The third sensor is attached to the tank roof.

The first sensor measures hydrostatic pressure of the liquid column and is used for calculating the mass of liquid in the tank. The difference in pressure readings between the first sensor and the second sensor is proportional to the average density of the liquid stored in the tank, thus providing an indication of the level of liquid within the tank. The roof pressure sensor is used for measuring the vapor pressure. The vapor pressure measurement taken by the third sensor is used for compensation of the vapor pressure influence. The typical HTG system also includes a temperature sensor that is installed roof without loss of seal or reference point. The probe consists of a series of pipes that are connected together, end to end, by large flanges. These flanges are welded to the pipes and then are connected to the mating flange of the subsequent pipe, with six or more bolts. The flanges may leak if the bolts connecting the flanges are not torqued evenly or torqued properly. Improper torquing has been a problem in the past and has required additional checking procedures by qualified inspectors. Manufacturing of the flanges also necessitates additional pressure testing, to assure the welding quality critical for a submersible probe construction. Finally, the dozens of nuts and bolts needed to make the necessary connections means that the installation procedure is time consuming and costly.

The MACStick probe also has a special thick flange located between some of the sections. The special thick flange is used as the basis for pressure and temperature sensor installation. The MACStick probe includes a cubical compartment head that is bolted onto the tank roof. The head contains an analog transmitter. The transmitter conveys pressure and temperature signals in 4 to 20 mA current signals. A MACStick analog transmitter can handle two pressure and two temperature sensors. Thus the standard MACStick probe configuration, containing 4 pressure and 4 temperature sensors, must include two analog transmitters in the probe head. In addition, each MACStick probe must have a remote central processing unit ("RCPU") attached to it. The RCPU provides analog to digital conversion of the current transmitters' signals, data processing and calculations.

While useful, the MACStick probe has several disadvantages beyond those mentioned previously. First, most liquid tanks are installed with stilling wells. Stilling wells, typically, are pipes that are fitted within the tank along the centerline. Stilling wells are used for a variety of purposes including the structural integrity of the tank itself. Some stilling wells are perforated to allow liquid from the tank to enter the well. The remaining stilling wells are not perforated. The non-perforated stilling wells are used in halfway between the first pressure sensor and the second pressure sensor. The temperature sensor is used to calculate the standard density and standard volume of the liquid, converted back to 60 F. (or 15 C.).

There are disadvantages with the typical HTG system. These disadvantages include inconvenient and costly installation of the pressure sensors along the tank wall. This installation requires either hot tapping or, in the alternative, taking the tank out of service until the sensors are installed. Further, additional valves must be installed between the tank and the sensor to allow for periodic calibration and maintenance of the pressure sensors.

Another disadvantage of the typical HTG system is that tank bulging affects the measurements. Tank bulging occurs when the walls of the tank deflect under the weight of the liquid contained therein. There is no practical possibility for precise measurement of the distance between the pressure sensors' actual location on the deformed tank wall. Consequently, there is an inherent error in the density calculation, and a corresponding error in the liquid level measurement. This error increases with the age and deterioration of the tank. Furthermore, because the density is measured in the relatively thin layer of liquid, there is more uncertainty in the result, which is calculated as hydrostatic pressure divided by density. Weather factors, such as wind, heating of the sensor by the sun, and temperature differences between environment (sensor body) and liquid (sensor diaphragm), may significantly affect the measured result. Finally, the zero drift of the pressure sensors requires periodic manual calibration and, if not calibrated often, the zero drift is a potential source of error.

Yet another prior art HTG system is sold by Measurement and Control Systems ("MACS"), located at Ackerstein Bldg., 103 Medinat Hayehudim Street, Herzliya Pituach 46766, Israel. The device is called MACStick, and it consists of a probe that is inserted into the middle of the tank. The probe itself runs from the bottom through the roof of the tank where the probe is fitted through a collar on the roof to allow for movement of the jurisdictions having environmental laws that forbid the venting of hydrocarbon vapors into the atmosphere. The MACStick probe, having large flanges positioned at regular intervals, cannot be used in tanks without stilling wells because the seals on the floating roofs cannot operate around the MACStick flanges. However, if the stilling well is not perforated, placing the MACStick probe within the stilling well does no good because the stilling well prevents the liquid from reaching the probe. The stilling well does not provide an adequate sample to the probe of the contents of the tank because the sample from the stilling well is not representative of the liquid dispersed throughout the tank. Consequently, the MACStick probe can only be used on liquid tanks having perforated stilling wells.

In addition to the limited applicability of the MACStick device, there are still other disadvantages. For example, pressure sensors are located within some of the flanges. The pressure sensor location on the flange that has a relatively large diameter means that a rather long channel is needed to provide the surrounding liquid access to the sensor diaphragm. These long channels are easily plugged or clogged by viscous or impure liquids stored in the tanks.

The last significant problem with the MACStick device is its reliance on analog transmitters with limited capacity, particularly when more than four pressure and temperature sensors are required for an application. Finally, MACStick, having analog transmitters, has a much lower tolerance to electromagnetic interference ("EMI") of the analog signal transmission. This design always requires more cables and also requires separate digital processing units for each sensor.

There is, therefore, a need in the art for a probe that is both easy to manufacture, easy to install, and that has the ability to function with floating roofs without violating environmental laws. It is an object of the present invention to provide an easy to make, easy to install, and easy to use probe that will work with any storage tank.

SUMMARY OF THE INVENTION

This and other objects are achieved by the present invention. The present invention is a probe rod composed of sensor housings, pipe sections, and joint sleeves all having a common outer diameter. The common outside diameter ensures that the present invention can be utilized without stilling wells while allowing standard floating-roof seals that do not violate environmental laws and standards.

The sensor housings and joint sleeves are threadably connected to the various pipe sections. The threadable connections have a double seal using an O-ring and threading (or sealing) paste that ensure a gas-tight seal while being easy to assemble. Pressure and temperature sensors are mounted within the sensor housings. Output leads from the sensors are threaded through the pipe sections and through throughways in the sensor housings and joint sleeves to a circuitry box mounted on the top of the probe rod. The circuitry box contains electronics for processing signals generated by the sensors and for transmitting the results to a remote location.

BRIEF DESCRIPTION OF THE DRAWINGS

A better understanding of the invention will be reached by reading the subsequent detailed description with reference to the drawings wherein.

DETAILED DESCRIPTION OF THE PREFERRED EMBODIMENTS

The present invention is a multi-sensor digital probe having a nearly constant outside diameter that does not interfere with floating roofs of liquid tanks.

Figure 1:
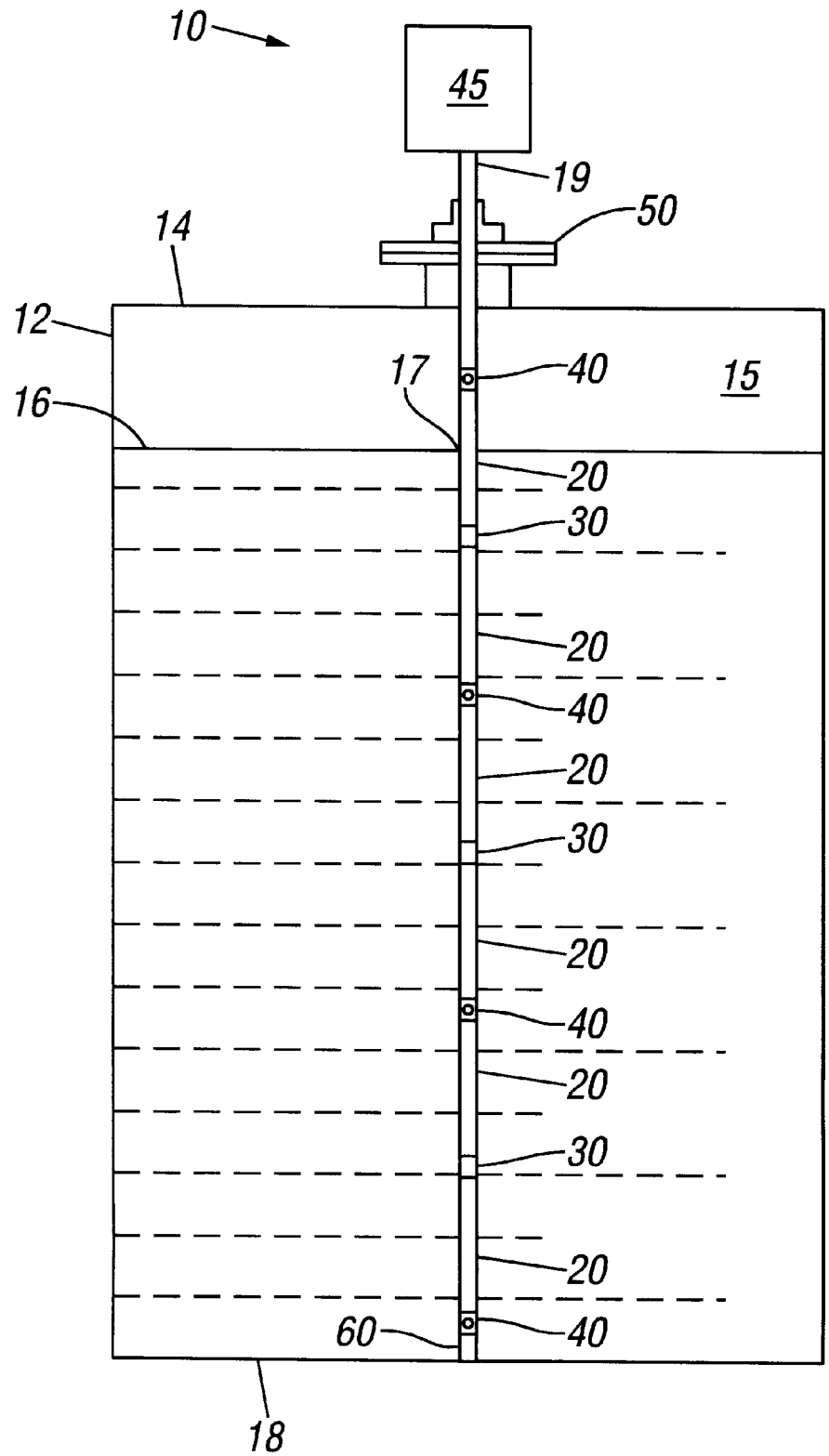
FIG. 1 shows the overall configuration of the probe of the present invention.
Figure 3:
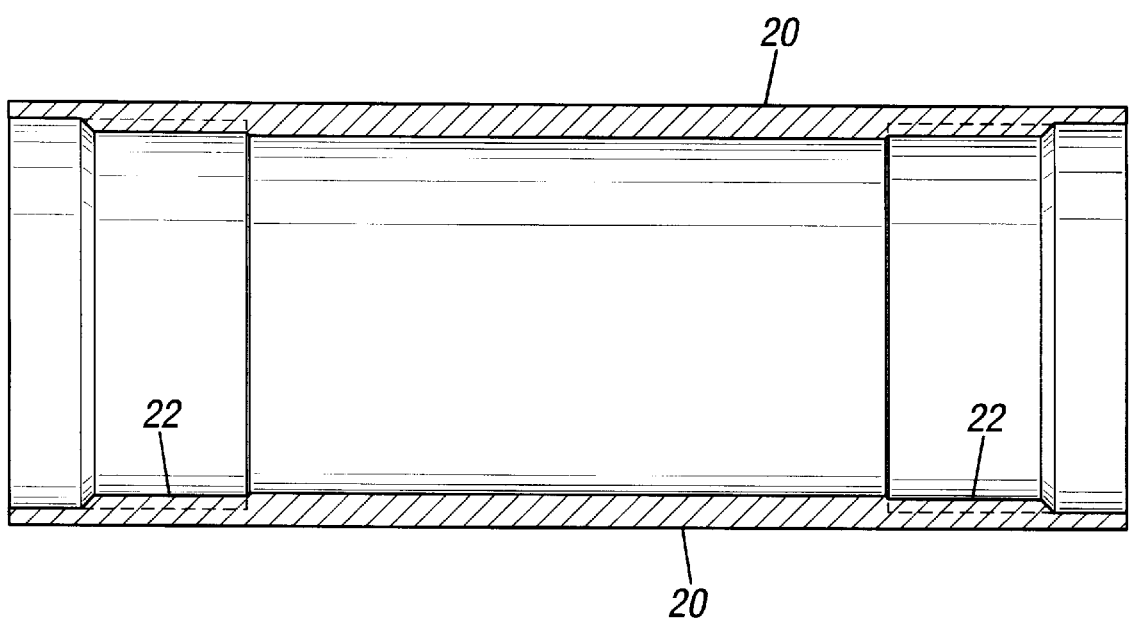
FIG. 3 shows a sectional view of a pipe section of the present invention.

As shown in FIG. 1, the probe 10 has four basic components: pipe sections 20, which alternatively can be tubes, sensor housings 40, joint sleeves 30, and a circuit box 45. The components are connected in series to form a probe rod 19 with the circuit box 45 at the top of the probe rod 19 as shown in FIG. 1. The pipe sections 20 are standard hollow pipes with female threads 22 at each end as shown in FIG. 3. The threading 22 of the pipe sections is designed to interfit the male threads of the sensor housings 40 and joint sleeves 30.

Figure 4:
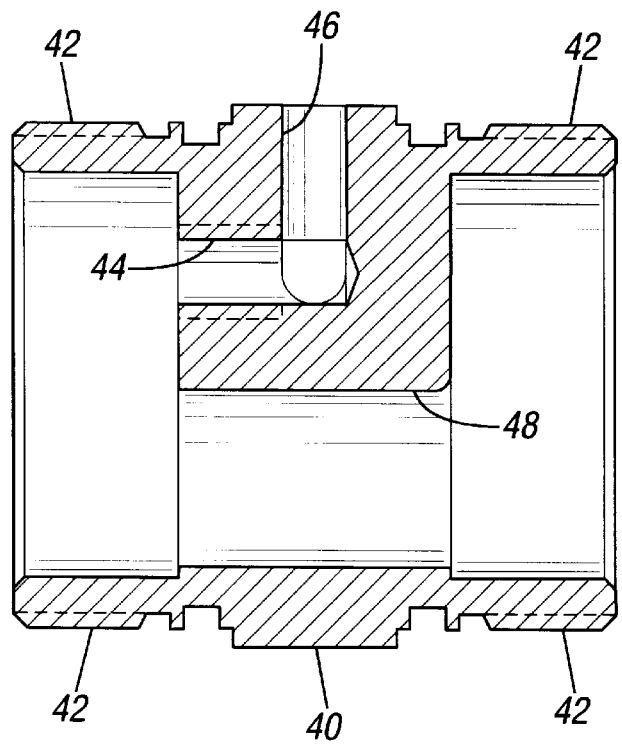
FIG. 4 shows a sectional view of the sensor housing of the present invention.

A typical sensor housing is shown in FIG. 4. The sensor housings 40 have male threads 42 at each end so that the sensor housings 40 may be threadably connected to the pipe sections 20. The outer diameter of the sensor housings 40 is the same as the outer diameter of the pipe sections 20. This continuity in outside diameters allows the present invention to be used in liquid tanks 12 having floating roofs 16. With this design, the floating roof can have a constant diameter seal 17 around the probe without having to use stilling wells or to accommodate large flanges as found in the prior art probes. Unlike tanks employing the prior art probes, the liquid tanks utilizing the present invention can use standard floating roof vapor seals that effectively prevent the escape of hydrocarbon gases and allow the liquid tanks to be in compliance with environmental laws.

Figure 6:
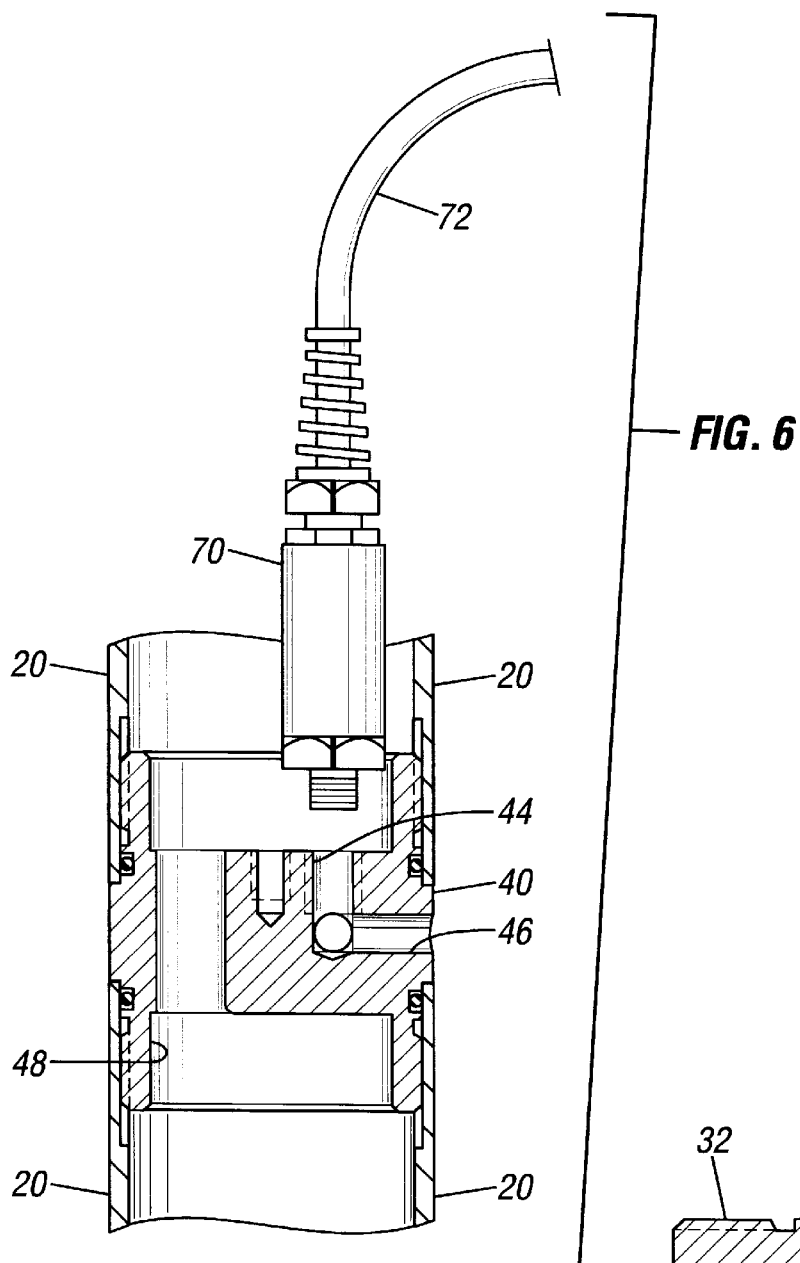
FIG. 6 shows a pressure sensor connected to a sensor housing of the present invention.

As shown in FIG. 4, the sensor housings 40 have mountings 44 that are designed to hold pressure and/or temperature sensors. A channel 46 is provided in the sensor housing 40 to couple the pressure sensor contained in the housing to the liquid contained in the liquid tank 12. These channels 46 are kept short so as to maximize the free association of surrounding liquid with the pressure sensor and to minimize clogging or liquid dynamic effects that may introduce error into the pressure measurements. Typically, a publicly available pressure sensor (not shown) is used with the present invention. The pressure sensor usually has a diaphragm, and the diaphragm of the pressure sensor is positioned horizontally in the channel 44 in order to provide exact actuation of the diaphragm at that location in the probe rod 19. As shown in FIG. 6, output leads 72 from the temperature and pressure probes 70 in the sensor housing 40, and leads from lower sensor housings, are fitted within a throughway 48 and into the pipe sections 20 leading up to the circuit box 45. No throughway is provided for the bottommost sensor housing 60 that is situated at the floor 18 of the liquid tank 12. In an alternative embodiment, the bottom sensor 60 is attached to a solid steel cylinder which spaces the pressure sensor above the sediment on the bottom of the tank 12.

Figure 2:
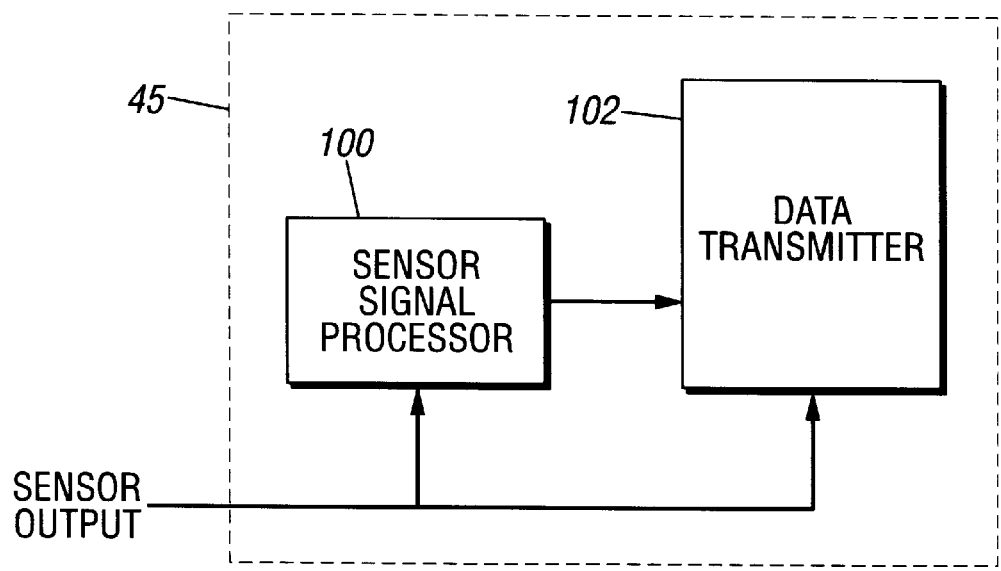
FIG. 2 shows the circuitry elements of the present invention.

The output of the pressure sensor can be analog or digital. If the pressure sensor, or the temperature sensor output analog signals, then analog-to-digital circuitry 102 should be provided in the circuit box 45 to convert the output signals from the sensors into digital form as shown in FIG. 2. Along with analog-output sensors, the present invention can utilize sensors with digital output. Any of the sensors permit self-calibration by the system, digital or analog. Digital sensors provide increased tolerance to EMI, and eliminate the need for analog-to-digital converters. An additional benefit of the invention is the ability to measure both gauge pressure and absolute pressure. If absolute pressure readings are needed, at least one sensor must be positioned near the bottom 18 of the liquid tank 12 and one sensor must be placed in the vapor area 15 as shown in FIG. 1. It is a unique feature of the present invention to have pressure sensors to measure vapor pressure in the tank and temperature sensors (contained within a sensor housing 40) in the vapor area 15 as shown in FIG. 1, to provide for tank shell corrections which are compensation for temperature changes outside the tank shell.

As with the pressure sensor, a publicly available temperature sensor (not shown) is used. The output of the temperature sensor can be analog or digital. The temperature sensor readings are used for two purposes. First, to measure the temperature of the liquid within the liquid tank. Second, to compensate for the influence of temperature on the pressure sensor measurements.

The pressure and temperature sensors can also be combined into a single unit that can be accommodated within the sensor housing. Combined sensor packages can reduce the number of leads that must be threaded through the probe rod and simplify assembly and maintenance. Furthermore, a combined temperature and pressure sensor package will provide more accurate pressure/temperature characterization results and improve the temperature influence compensation calculations.

Figure 7:
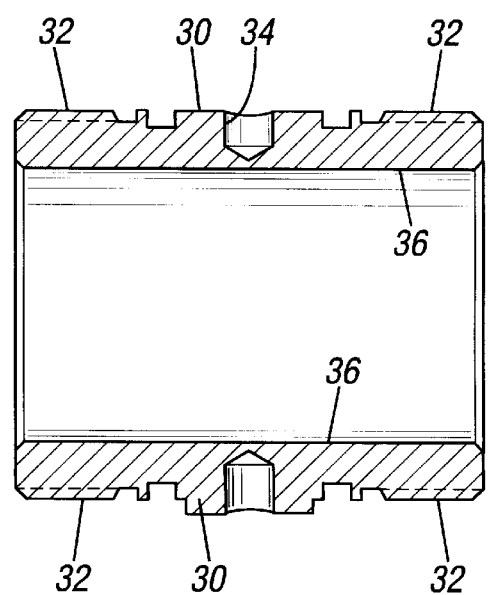
FIG. 7 is a sectional view of a joint sleeve of the present invention.

Joint sleeves 30 are utilized to join pipe sections 20. As shown in FIG. 7, the joint sleeves 30 have male threads 32 at each end so that the joint sleeves 20 may be threadably connected to the pipe sections 20. The outer diameter of the joint sleeve 20 is the same as the outer diameter of the pipe sections 20. It will be understood that the male-female mating system described herein can be reversed, in that the pipe sections 20 can be fitted with male threads and the sensor housings 40 and joint sleeves 30 fitted with corresponding female threads. As with the sensor housings, the joint sleeves 30 also have throughways 36 to allow sensor output wires to be threaded from the sensors through the probe rod 19 to the circuit box 45. Finally, the joint sleeves 30 can be fitted with side holes 34 that provide a convenient way for work crews to insert and utilize torque-generating tools during assembly and maintenance of the probe rod 19.

Figure 5:
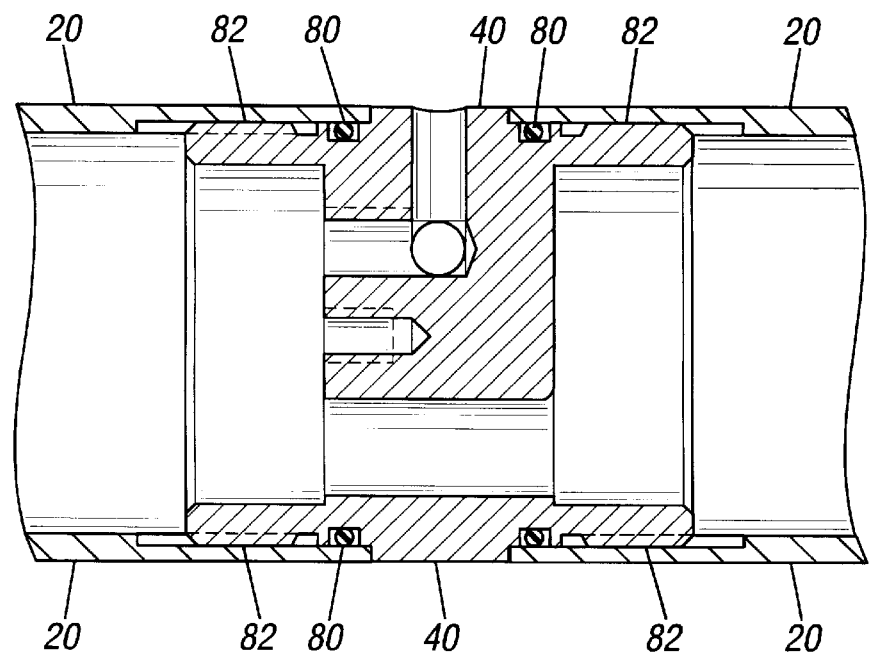
FIG. 5 shows a sectional view of the sensor housing connected to pipe sections of the present invention.

The use of threaded connections is an improvement over the prior art that used flanges that were bolted together. As mentioned earlier, the bolts of the prior art devices had to be torqued evenly, otherwise, leaking may occur because part of the sealing O-ring was exposed while another part was over-compressed. In the preferred embodiment of the present invention as shown in FIG. 5, there is a threadable connection between the pipe sections 20 and the sensor housings 40 and joint sleeves 30. Further, the threaded connection of the present invention contains a double seal that is used to seal the connection between the pipe sections 20 and the sensor housings 40 and joint sleeves 30. As shown in FIG. 5, an O-ring 80 is placed within the threaded section to provide a liquid-tight seal. The other part of the double seal consists of thread sealing paste 82 that is applied to the threads when the probe rod 19 is assembled. The threaded connection of the present invention ensures that the O-ring 80 is not subjected to undue stress when the components are assembled. The connection design of the present invention enables easier assembly and a far more reliable gas-tight seal and eliminates many human-errors in the assembly process, a very important consideration for submersible probe design. Unlike the prior art designs, the present invention has only two torque sensitive assembly operations instead of the six to twelve torque dependent operations needed to bolt the prior art's flanges together. Furthermore, unlike the prior art assembly methods, the torque sensitive assemblies of the present invention do not jeopardize the sealing integrity of the connection. Finally, unlike the prior art designs, there are no welded elements that are a source of leaks and corrosion and that require frequent inspection during construction, assembly, and maintenance.

Yet another benefit of the threaded connection is the ability to use stronger pipes with greater wall thickness than in prior art designs while maintaining the same overall probe diameter. The threaded connections can be left-handed, right-handed, or both. That makes it possible to install the present invention with a wider variety of installation flanges.

One method of assembly of the present invention can be accomplished near the liquid tank itself. The requisite number of the various components, e.g., pipe sections 20, sensor housings 40, sensors, and joint sleeves 30, are provided. To begin, the desired locations of the sensors are identified. The sensor housings 40 are connected to pipe sections 20 to ensure the proper placement of the sensors at the desired locations within the probe rod 19. Pipe sections 20 that are connected by joint sleeves 30 can be used to provide proper spacing between sensor housings 40. Once assembled, the components form a probe rod 19 that is inserted into the liquid tank 12 from a hole 50 in the roof 14 of the liquid tank 12 as shown in FIG. 1. Typically, a bottommost sensor housing 60 is at the tip of the probe rod 19 so that it sits at the bottom 18 of the liquid tank 12. The probe rod 19 rests upon the bottom 18 of the liquid tank 12 and protrudes a short distance from the roof 14 of the liquid tank 12. Optionally, a circuitry box 45 containing circuitry 100 is connected to the probe rod 19. In the preferred embodiment, the circuitry box 45 is threadably connected to the topmost pipe section 20.

An alternate method of assembly of the present invention can be done while situated on the roof of the liquid tank. First pipe sections 20, joint sleeves 30, and sensor housings 40 are provided. Normally, at least one sensor is placed at or near the bottom 18 of the liquid tank 12. To this end, a sensor housing 40 is made the bottommost sensor housing. The wires from the sensors are threaded through a pipe section 30 that is threadably connected to the top side of the bottommost sensor housing 40. The bottommost sensor housing 40 is then inserted into the liquid tank 12 until only a portion of the pipe section 20 protrudes from the roof. At this point, the protruding pipe section is secured and a second sensor housing 40 or joint sleeve 30 is threadably connected to the protruding pipe section 20 to make a topmost sensor housing or joint sleeve. A second pipe section 20 is threadably connected to the last-connected joint sleeve 30 or sensor housing 40 forming a topmost pipe section 20. The probe is then moved down into the liquid tank 12 until only a portion of the topmost pipe section protrudes from the roof of the tank. This process is repeated until the bottommost sensor housing 40 rests upon the floor 18 of the liquid tank 12 and a portion of the topmost pipe section 20 protrudes from the roof 14 of the liquid tank 12. As with the previous embodiment, a circuitry box 45 is then threadably connected to the topmost pipe section 20. The bottommost sensor housing may alternatively rest on a spacer, permitting the sensor to reside above the sediment on the tank floor.

As shown in FIG. 2, the optional circuitry box 45 contains circuitry 100 for connecting the output leads from the sensors to a remote processor, main-frame computer or personal computer (not shown). An alternate embodiment includes circuitry, such as data transmitter 102, for transmitting the output from the sensors to a remote location, by either wires, fiber optics, or wireless methods. While the data transmitter 102 can be analog, the preferred embodiment of the present invention utilizes a digital transmitter. Yet another embodiment includes circuitry, such as sensor signal processor 104, for interpreting the signals, either analog or digital, that are generated by the sensors. The resultant processed data from signal processor 104 can then be transmitted by transmitter 102. As with the data transmitter 102, the preferred embodiment utilizes digital circuitry for the sensor signal processor 104. In the preferred embodiment, both the sensor signal processor 104 and the data transmitter 102 are capable of handling output from multiple sensors, either in sequence or simultaneously.

The foregoing is a description of the arrangement and operation of embodiments of the invention. The scope of the invention is considered to include the described embodiment together with others obvious to those skilled in the art.

What is claimed is:

1. A probe with no moving parts, for use in above and below grounds a liquid tank having a floor and walls, capable of continuous measurement of a liquid while emersed in that liquid, wherein said probe comprises:
   at least two pipe sections a first section and a second section, each of said pipe sections detachable connectable to the other, wherein each has a top end and a bottom end and each pipe section has an outer diameter which is equal to the outer diameter of the other section, thereby providing a smooth exterior surface when the at least two pipe sections are detachably connected together;
   at least one connector connecting said pipe sections, said connector constructed and arranged to connect said top end of said first pipe section to said bottom end of said second pipe section to form a probe rod having a common outer diameter further said connector having a channel to provide contact with liquid from said tank to one of at least two sensors, a first sensor and a second sensor;
   a first sensor, contained in the probe rod capable of continuous temperature measurement through direct contact with the liquid, and a second sensor contained in the probe rod capable of continuous pressure measurement through direct contact with the liquid, and wherein said first sensor for continuous pressure measurement has a diaphragm which is oriented so that the sensing side of said diaphragm is horizontally to the probe and oriented towards the floor of the tank;
   means for controlling the first and second sensors to produce output signals; and
   means for compiling the output signals and transferring the compiled data to another device.

2. A probe as in claim 1 wherein said at least one connector is a sensor housing.

3. A probe as in claim 1 wherein said at least one connector is a joint sleeve.

4. A probe as in claim 1 wherein said pipe sections are threaded on said top end.

5. A probe as in claim 1 wherein said pipe sections are threaded on said bottom end.

6. A probe as in claim 2 wherein said sensor housing has a throughway.

7. A probe as in claim 1 wherein said pressure sensor measures the liquid head above said pressure sensor.

8. A probe as in claim 1 wherein said probe further contains circuitry, said circuitry capable of calculating compensation factors to compensate for air bubbles locked between the surface of said liquid and said diaphragm of said pressure sensor.

9. A probe as in claim 1 wherein said pressure sensor has a digital output.

10. A probe as in claim 1 wherein an output signal of said temperature sensor is capable of compensating for a temperature influence on a pressure sensor measurement.

11. A probe as in claim 1 wherein said pipe has a threaded end and said connector has a threaded end capable of interfitting with said threaded end of said pipe to form a threaded connection.

12. A probe as in claim 11 wherein a thread sealing paste is applied to said threaded connection.

13. A probe as in claim 11 wherein an O-ring is positioned within said threaded connection to form a gas tight threaded connection.

14. A probe as in claim 11 wherein a thread sealing paste is applied to said threaded connection and an O-ring is positioned within said threaded connection to form a gas tight threaded connection.

15. A probe as in claim 3 wherein said joint sleeve has a throughway.

16. A probe as in claim 3 wherein said joint sleeve has a side hole.

17. A probe as in claim 1 wherein said probe further has a box.

18. A probe as in claim 17 wherein said box is positioned at a top of said probe.

19. A probe as in claim 17 wherein said box is threadably connected to one of said pipe sections.

20. A probe as in claim 17 wherein said box contains circuitry.

21. A probe as in claim 20 wherein said circuitry is digital.

22. A probe as in claim 20 wherein said circuitry is capable of connecting to another of said probes.

23. A probe as in claim 20 wherein said circuitry is capable of interfacing with more than one of said sensors.

24. A probe as in claim 20 wherein said circuitry is capable of interfacing with a processor.

25. A probe as in claim 20 wherein said circuitry is capable of interfacing with a computer.

26. A probe as in claim 20 wherein said circuitry contains sensor signal processor.

27. A probe as in claim 1 wherein an outer diameter of said connector is equal to an outer diameter of said pipe sections.

28. A probe as in claim 9 further having a self calibrating feature using said pressure sensor.

29. A probe as in claim 9 wherein two pressure sensors measure absolute pressure.

* * * * *